(12) United States Patent
Shi

(10) Patent No.: US 9,119,124 B2
(45) Date of Patent: Aug. 25, 2015

(54) METHOD AND SYSTEM FOR COMMUNICATION IMPLEMENTATION FOR USER EQUIPMENT

(75) Inventor: Xiaojuan Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 186 days.

(21) Appl. No.: 13/814,586

(22) PCT Filed: Aug. 13, 2010

(86) PCT No.: PCT/CN2010/076000
§ 371 (c)(1),
(2), (4) Date: Feb. 6, 2013

(87) PCT Pub. No.: WO2012/019369
PCT Pub. Date: Feb. 16, 2012

(65) Prior Publication Data
US 2013/0137435 A1    May 30, 2013

(51) Int. Cl.
*H04W 36/00*    (2009.01)
*H04W 36/20*    (2009.01)
*H04W 88/06*    (2009.01)

(52) U.S. Cl.
CPC .......... *H04W 36/20* (2013.01); *H04W 36/0083* (2013.01); *H04W 88/06* (2013.01)

(58) Field of Classification Search
CPC . H04W 36/20; H04W 36/0083; H04W 88/06; H04W 88/02; H04W 92/08
USPC ........................ 455/436–444; 370/331–333
See application file for complete search history.

(56) References Cited

U.S. PATENT DOCUMENTS

| 8,249,643 B1 * | 8/2012 | Tailor et al. ................. 455/525 |
| 2009/0021377 A1 | 1/2009 | Launiainen |

(Continued)

FOREIGN PATENT DOCUMENTS

| CN | 101553054 A | 10/2009 |
| JP | 2013534798 A | 9/2013 |

(Continued)

OTHER PUBLICATIONS

MediaTek, "Discussion on In-device Coexistence Interference Avoidance," 3GPP TSG-RAN WG2 Meeting #70bis, R2-103644, Jun. 28, 2010. (3 pages—see entire document).

(Continued)

*Primary Examiner* — Ajit Patel
(74) *Attorney, Agent, or Firm* — Oppedahl Patent Law Firm LLC

(57) ABSTRACT

The disclosure provides a method and system for communication implementation for a user equipment, which include: a user equipment reports the state information of other sub-devices except the sub-device adopting Long Term Evolution (LTE) technology to the network (300); the network performs radio resource management according to the obtained state information (301). It can be seen from the method of the disclosure that the network, already knowing the state information of the user equipment, performs radio resource management. As for the sub-devices in the user equipment which are configured to adopt the LTE technology and as for other sub-devices adopting such technologies other than the LTE technology as WLAN technology, Bluetooth technology, and the like, the method achieves effective suppression of the in-device co-existence interference, thus improving the communication quality of the radio technologies in the user equipment and the communication experience of the users.

15 Claims, 4 Drawing Sheets

(56) References Cited

U.S. PATENT DOCUMENTS

| | | |
|---|---|---|
| 2009/0213773 A1 | 8/2009 | Yoon et al. |
| 2009/0247218 A1 | 10/2009 | Lee et al. |
| 2010/0067469 A1 | 3/2010 | Gaal et al. |
| 2010/0203832 A1 | 8/2010 | Russell et al. |
| 2010/0234017 A1* | 9/2010 | Lim et al. .................. 455/426.1 |
| 2011/0261792 A1* | 10/2011 | Oerton et al. ................ 370/335 |
| 2012/0195249 A1* | 8/2012 | Bhattacharjee et al. ...... 370/312 |
| 2013/0059591 A1* | 3/2013 | Tiwari et al. ................. 455/443 |

FOREIGN PATENT DOCUMENTS

| | | |
|---|---|---|
| JP | 2013535139 A | 9/2013 |
| JP | 2013538499 A | 10/2013 |
| KR | 20090091634 A | 8/2009 |
| WO | 2010088814 A1 | 8/2010 |
| WO | 2012010104 A1 | 1/2012 |

OTHER PUBLICATIONS

International Search Report in international application No. PCT/CN2010/076000, mailed on May 5, 2011.

English Translation of the Written Opinion of the International Search Authority in international application No. PCT/CN2010/076000, mailed on May 5, 2011.

* cited by examiner

METHOD AND SYSTEM FOR COMMUNICATION IMPLEMENTATION FOR USER EQUIPMENT

TECHNICAL FIELD

The present disclosure relates to a co-existence technology of multiple radio technologies in a terminal, and more particularly, to a method and system for communication implementation for a user equipment in which multiple radio technologies coexist.

BACKGROUND

With the development of radio technologies, more and more radio technologies begin to be widely adopted. Particularly in order to meet multiple communication requirements of terminal clients, multiple radio technologies will be adopted simultaneously in a same intelligent terminal.

FIG. 1 is a diagram of a user equipment adopting two or more radio technologies simultaneously. As shown in FIG. 1, in a user equipment 100, three radio technologies are adopted. A sub-device 101 (or called sub-module) adopts Long Term Evolution (LTE) technology, a sub-device 102 (i.e., Wireless Local Area Network Station (WLAN STA)) adopts Wireless Local Area Network (WLAN) specified by the IEEE Std 802.11 specification, and a sub-device 103 adopts Bluetooth radio technology specified by the IEEE Std 802.15 specification. The three sub-devices in the user equipment 100 perform radio communication with peer ends corresponding to respective radio technologies, respectively. The sub-device 101 performs radio communication with an E-UTRAN Node B (LTE eNB) 104 through an air interface; the sub-device 102 performs radio communication with another WLAN STA device 105 through an air interface; and the sub-device 103 performs radio communication with another Bluetooth device 106 through an air interface.

In FIG. 1, the sub-device 101, the sub-device 102 and the sub-device 103 are connected with each other through an inter-radio interface, for example, the sub-device 101 is connected with the sub-device 102 through L101 and the sub-device 101 is connected with the sub-device 103 through L102. Alternatively, the three sub-devices are controlled by a common control device 107.

As the user equipment is too small in volume, if two or more radio technologies are set in a same user equipment simultaneously, it certainly means that spatial distance between the sub-devices on which the two or more radio technologies are set is very small, for example, a few centimeters. That is, it is unable to design a large enough spatial isolation between antenna ports used by the two or more radio technologies, as such, when the radio technologies in a same user equipment use adjacent bands, due to reasons such as out of band emission and spurious emissions, the reception of another radio technology sub-device will be interfered when one of the radio technology sub-devices is emitting, vice versa. Furthermore, such interference cannot be eliminated by the existing filters, so the communication quality of the radio technology sub-devices is influenced seriously. Herein, said interference is called in-device co-existence interference.

Taking the user equipment 100 shown in FIG. 1 as example, it is assumed that WLAN and Bluetooth use the Industrial, Scientific and Medical (ISM) band (2.4 GHz-2.5 GHz), wherein WLAN uses the frequency band 2.4 GHz-2.4835 GHz in the ISM band, and Bluetooth use the frequency band 2.4 GHz-2.497 GHz in the ISM band. The ISM band is adjacent to the LTE band 40 (Band40: 2.3 GHz-2.4 GHz) and the uplink band of the band 7 (Band7 UP: 2.5 GHz-2.57 GHz), as shown in FIG. 2.

If the sub-device 101 uses a Time Division Duplex (TDD) mode and just uses Band40, or, the sub-device 101 uses a Frequency Division Duplex (FDD) mode and just uses Band7 in the uplink, mutual interference will exist between the sub-device 101, the sub-device 102 and the sub-device 103. The specific interference is as shown in Table 1.

TABLE 1

| Interference between the LTE Band40 and the ISM band | | |
|---|---|---|
| ISM interferes LTE | The lower frequency band of the ISM band (for example, the lower 20 MHz frequency band) | Interfere the whole LTE Band40, with strong interference (larger than 50 dB) |
| | Other frequency bands of the ISM band | Interfere the higher frequency band of the LTE Band40 (for example, the higher 20 MHz frequency band) |
| LTE interferes ISM | The higher frequency band of the Band40 (for example, the higher 30 MHz frequency band) | Interfere the whole ISM band |
| | The other frequency bands of the Band40 | Interfere the lower frequency band of the ISM band (for example, the lower 20 MHz frequency band), with strong interference (larger than 50 dB) |
| Interference between the LTE Band7 UP and the ISM band | | |
| LTE interferes ISM | The lower frequency band of the Band7 (for example, the lower 10 MHz frequency band) | Interfere the whole ISM frequency band, with strong interference (larger than 50 dB) |
| | The other frequency bands of the Band7 | Interfere the higher band of the ISM band (for example, the higher 30 MHz frequency band) |

As shown in FIG. 2, as the LTE Band7 is far away from the ISM band, the ISM frequency band will not interfere the downlink of the LTE Band7.

As shown in Table 1, in the in-device co-existence interference between the LTE and the ISM-related radio technologies, the LTE Band40 and the ISM interfere mutually; the LTE Band7 will interfere the ISM but will not be interfered by the ISM.

In the existing LTE system, LTE user equipment detects the interference by the measurement of the Reference Signal Received Quality (RSRQ). This kind of detection mechanism is applicable to an scenario where the network has known the interference source. Generally, the network may configure rational measurement evaluation and measurement report parameters according to the network planning and network optimization or under the support of the Self-Organising Networks (SON) functions, to determine whether the user equipment is interfered in a serving cell by the signal quality measurement result of the serving cell reported by the user equipment (UE) and the signal quality measurement result of the relative neighbouring cells. If the network determines that the UE is interfered, the Node B may guarantee the communication quality of the UE by the inter-cell interference coordination technology or by handing over the UE to a neighbouring cell. During the measurement for the UE in the existing LTE system, as interference from the outside of the device usually becomes stronger gradually, the measurement report reported to the Node B by the UE is a result that is obtained and filtered all of the measurement results within a period of time (320 ms, for example, even longer), to avoid the Ping-pong handover of the UE caused by the short jitter of the signal.

Different from such interference from the outside of the device, the in-device co-existence interference has burst property and strong interference. On one hand, as the turn on time of the ISM-related radio technologies completely depends on the action of the user, the interference has burst property; on the other hand, as the ISM-related radio technologies and the LTE are located in a same user equipment, the spatial isolation between the antenna ports thereof is very small, and the interference has strong interference property. Therefore, in a user equipment in which multiple radio technologies coexist, if the LTE UE adopts the existing interference detection mechanism, detection will be too slow, which influences the data transmission of the LTE, even causes calls lost. In addition, the existing interference detection mechanism of the LTE can only detect an event that the LTE is interfered, but it cannot detect an event that the LTE interferes other devices, the interference to the ISM-related radio technologies from the LTE cannot be solved, so that the data transmission of the ISM-related radio technologies in the device is influenced, even interrupted.

Obviously, the in-device co-existence interference inside a device adopting multiple radio technologies seriously reduces the communication quality of all radio technologies in the user equipment, and influences the communication experience of the user.

SUMMARY

The major purpose of the disclosure is to provide a method and system for communication implementation for a user equipment, which can effectively suppress the co-existence interference in the device, improve the communication quality of all radio technologies supported by the user equipment, and improve the communication experience of the user.

To achieve the above purpose, the present disclosure provides following technical solutions.

A method for communication implementation for a user equipment is provided, which includes following steps:

a user equipment reports state information of other sub-devices except a sub-device adopting Long Term Evolution (LTE) technology to a network; and the network performs radio resource management according to the state information.

The method further includes the following step preceding other steps: the network enables the user equipment to report the state information of other sub-devices except the sub-device adopting LTE technology.

The step that the network enables the user equipment to report the state information of other sub-devices except the sub-device adopting LTE technology includes that:

the network sends enabling information in the RRC connection reconfiguration message to instruct the user equipment to report the state information of other sub-devices inside the user equipment except the sub-device adopting LTE technology;

or, the network sends the enabling information in an RRC connection setup message; or, the network sends the enabling information in a new RRC message.

The method further includes the following step preceding other steps: the user equipment acquires the state of other sub-devices except the sub-device adopting LTE technology, and this step includes that:

the sub-device adopting LTE technology acquires the state information through an inter-radio interface or a control device in the user equipment.

The state information includes the information about the on or off state of other sub-devices except the sub-device adopting LTE technology in the user equipment.

The state information further includes information about (an) interfered LTE frequency band(s).

The state information further includes information about additional measurement results.

The information about the additional measurement results is:

the measurement results of all neighbouring cells, for all configured measurement tasks, already meet the measurement report conditions of the respective measurement task and are saved in a cell trigger list corresponding to the respective measurement task; or, the measurement results of N strongest neighbouring cells, for all configured measurement tasks, already meet the measurement report conditions of the respective measurement task and are saved in a cell trigger list corresponding to the respective measurement task, wherein N is a value preset for the network and the user equipment.

The step of reporting the state information to the network includes that: reporting the state information to the network by including the state information in an expanded proximity indication message; or, reporting the state information to the network by including the state information in an expanded RRC connection setup complete message; or, reporting the state information to the network by including the state information in an expanded RRC connection reconfiguration complete message; or, reporting the state information to the network by including the state information in a new RRC message.

The step that the network performs radio resource management according to the state information includes: performing connection mobility control or multi-carrier management according to the state information.

The step that the network performs mobility connection management control according to the state information includes:

performing operations according to the on or off state of the other sub-devices displayed by the received state information, which includes: when the user equipment does not work on Band40/Band7, the network does not hand the user equipment over to Band40/Band7 when performing handover decision; or configuring the user equipment with measurement configurations for accelerating the interference detection.

The state information includes the information about the on or off state of other sub-devices except the sub-device adopting LTE technology in the user equipment and the information about the interfered LTE frequency band(s). The network performs connection mobility control according to the state information, the step includes: performing following operations according to the information about on or off state of other sub-devices and the information about the interfered LTE frequency band(s):

when the information about the interfered LTE frequency band is Band40-UP:

when the user equipment works on the lower frequency band of Band40, the network determines that the UE is not subject to the in-device co-existence interference so that no operation is needed; or, when the user equipment works in a multi-carrier state, a primary serving cell works on the lower frequency band of Band40 and one or more secondary serving cells works on the higher frequency band of Band40, the network deactivates or deletes one or more of the secondary serving cells; or, when the user equipment works in a single-carrier state and on the higher frequency band of Band40, the network hands the user equipment over to the lower 80M frequency band of Band40; and when the received information about the interfered LTE frequency band is Band40-all, which means that the whole frequency band of Band40 is interfered, performing the following operations according to the information about on or off state of other sub-devices showing by the received state information:

when the user equipment does not work on Band40/Band7, the network does not hand the user equipment over to Band40/Band7 when performing handover decision; and configuring the user equipment with measurement configurations for accelerating an interference detection.

The state information includes the information about the on or off state of other sub-devices except the sub-device adopting LTE technology in the user equipment and the information about the additional measurement results; the step that the network performs connection mobility control according to the obtained state information, includes that:

when the user equipment works on Band40/Band7, the network performs handover decision according to the information about the additional measurement results reported by the user equipment and hands the user equipment over to a neighbouring cell indicated by the information about the additional measurement results.

The state information includes the information about the interfered LTE frequency information, which is Band40-UP; the step that the network performs multi-carrier management includes that:

when the user equipment works in the multi-carrier state, a primary serving cell of the UE works on the lower frequency band of Band40 and one or more secondary serving cells works on the higher frequency band of Band40, the network deactivates or deletes the one or more of the secondary serving cells.

A method for handover implementation for a user equipment is provided, which includes the following steps:

a source network of a user equipment sends a handover request message to a target network of the user equipment, wherein the RRC context of the handover request message includes enabling information about the source network enabling a user equipment to report the state of other devices except a sub-device adopting the LTE technology;

the target network returns a handover request acknowledge message to the source network; Then, communication between the user equipment and the target network includes that the user equipment reports to the network the state information of other sub-devices except the sub-device adopting LTE technology; and the network performs radio resource management according to the obtained state information.

The handover request message further includes information about the on and off state of other sub-devices except the sub-device adopting the LTE technology in the user equipment.

The handover request message further includes information about the interfered LTE frequency band(s).

A system for communication implementation for a user equipment is provided, which includes a user equipment and a network. The user equipment is provided with a sub-device adopting Long Term Evolution (LTE) technology and other sub-devices adopting other technologies except LTE technology.

The user equipment is configured to acquire state information of other sub-devices except the sub-device adopting LTE technology, and to report the state information to the network.

The network is configured to perform radio resource management according to the obtained state information; wherein the network may be a Node B.

The network is further configured to enable the user equipment to report the state information of other sub-devices except the sub-device adopting the LTE technology.

The system further includes a target network when the user equipment performs handover and the network is a source network.

The source network is further configured to send a handover request message to the target network to which the user equipment will be handed over, wherein the RRC context of the handover request message includes enabling information of the source network to enable the user equipment to report the state of other sub-devices except the sub-device adopting the LTE technology.

The target network is configured to return a handover request acknowledge message to the source network.

The source network is further configured to include in the handover request message the information about the on and off state of other sub-devices except the sub-device adopting the LTE technology in the user equipment.

The source target network is further configured in the handover request message the information about the interfered LTE frequency band(s).

It can be seen from the technical solutions provided by the disclosure, state information of other sub-devices except the sub-device adopting LTE technology, which is reported by a user equipment to a network, is included; and the network performs radio resource management according to the state information. According to the method of the present disclosure, the network, already knowing the state information of the user equipment, performs radio resource management. As for the sub-devices in the user equipment which are configured to adopt the LTE technology and as for other sub-devices adopting such technologies other than the LTE technology as WLAN technology, Bluetooth technology, and the like, the method achieves effective suppression of the in-device co-existence interference, thus improving the communication quality of the radio technologies in the user equipment and the communication experience of the users.

DETAILED DESCRIPTION

Figure 3:
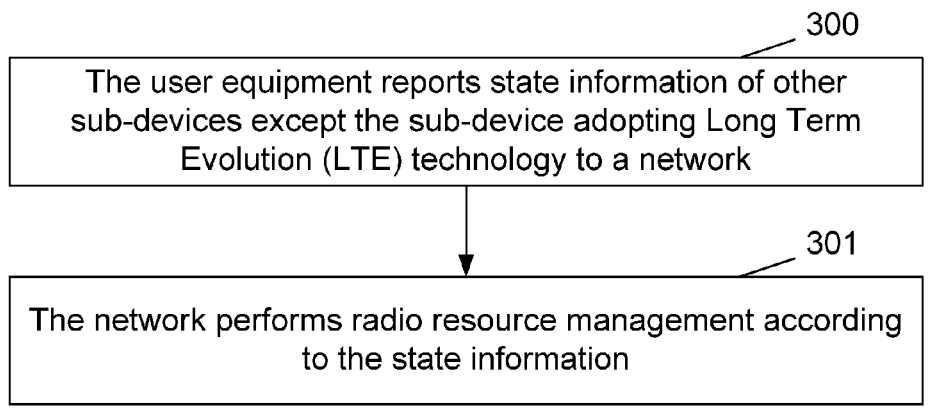
FIG. 3 is a flow chart of a method for communication implementation for the user equipment.

FIG. 3 is a flow chart of a method for communication implementation for the user equipment. Referring to FIG. 3, the method includes the following steps:

Step 300: A user equipment reports the state information of other sub-devices except the sub-device adopting LTE technology to the network, wherein the network may be a Node B.

Before this step, a step that the user equipment obtains the state of other sub-devices except the sub-device adopting LTE technology is further included.

Figure 1:
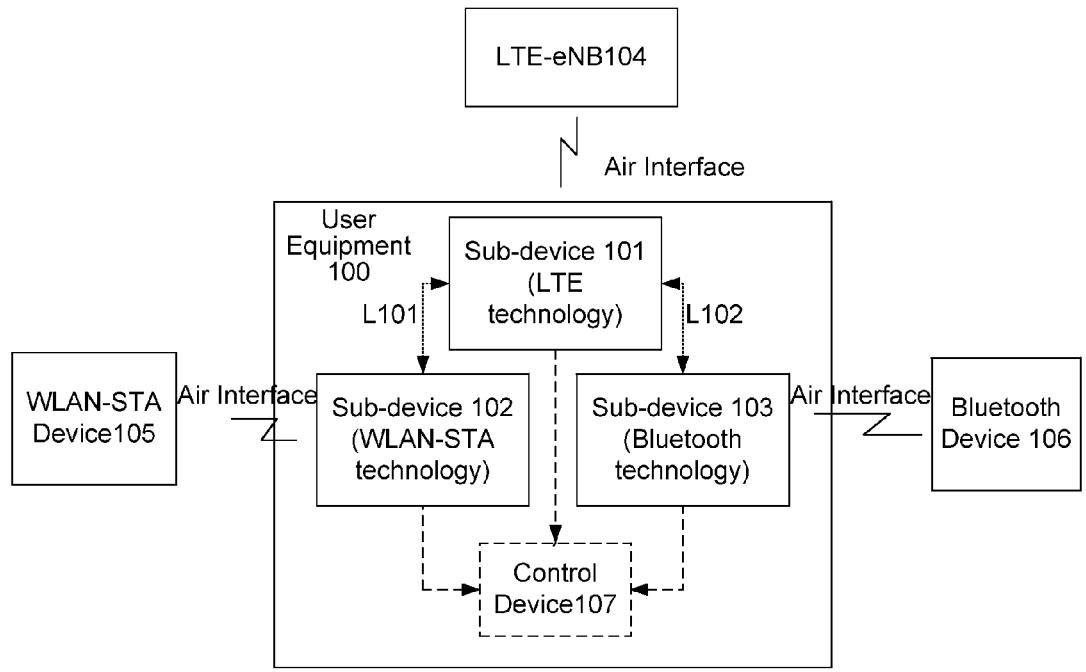
FIG. 1 is a diagram of a user equipment adopting two or more radio technologies simultaneously.
Figure 2:
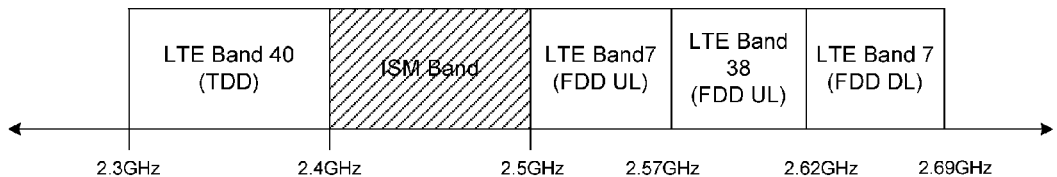
FIG. 2 is a diagram of the position relationship between LTE band and ISM band.

Referring to FIG. 1, the sub-devices adopting different radio technologies are connected with each other through an inter-radio interface, or the sub-devices adopting different radio technologies are simultaneously controlled by a common device. Therefore, the LTE sub-device in the UE can get the on/off state of other sub-devices in the UE, e.g. the ISM sub-devices shown in FIG. 1, using either of the above two ways. If the other sub-devices are on, further, the LTE sub-device in the UE can further get the working frequency of other sub-devices in either of the above ways.

In this step, the UE can utilize a proximity indication message to report the state information of other sub-devices to the network, namely, expanding the proximity indication message to include the obtained state information of other sub-devices.

Alternatively, as other sub-devices can be on at the beginning of or before the set up of the radio resource control connection, the UE can expand an RRC connection setup complete message or an RRC connection reconfiguration complete message to include the obtained the state information of other sub-devices. It should be noted that when the UE reports the state information to the network through the RRC connection setup complete message, the state information does not include information about the additional measurement results.

Alternatively, the UE includes the obtained the state information of other sub-devices in a new RRC message, e.g., a new sub-device state indication message.

In this step, the state information of other sub-devices that the UE reports to the network at least includes the information about on (further known as "in use") or off (further known as "out of use") state of other sub-devices.

Further, the state information further includes: information of (an) interfered LTE frequency band(s), e.g. Band40-all (the whole frequency band of Band40) and Band40-UP (higher frequency band of Band40, e.g. higher 20 MHz frequency band).

Band40-all indicates that the whole Band40 of LTE will be interfered. Taking Table 1 as an example, after the Node B receives the information field, it can be inferred that the ISM sub-devices woks at a lower frequency band (e.g. low 20 MHz frequency band). Band40-UP indicates a higher frequency band of LTE Band40 (e.g. higher 20 MHz frequency band) interfering the LTE Band40. Taking Table 1 as an example, after the Node B receives the information field, it can be inferred that the ISM sub-devices woks at a higher frequency band (e.g. a frequency band other than the lower 20 MHz frequency band).

The state information further includes information about the additional measurement results.

The information about the additional measurement results, for example, may be the measurement results of all neighbouring cells, for all configured measurement tasks, already meet the measurement report conditions of the respective measurement task and are saved in the cell trigger list corresponding to the respective measurement task; or may be the measurement results of N strongest neighbouring cells, for all configured measurement tasks, already meet the measurement report conditions of the respective measurement task and are saved in the cell trigger list corresponding to the respective measurement task, wherein N is a value preset for the network and the user equipment.

Figure 5:
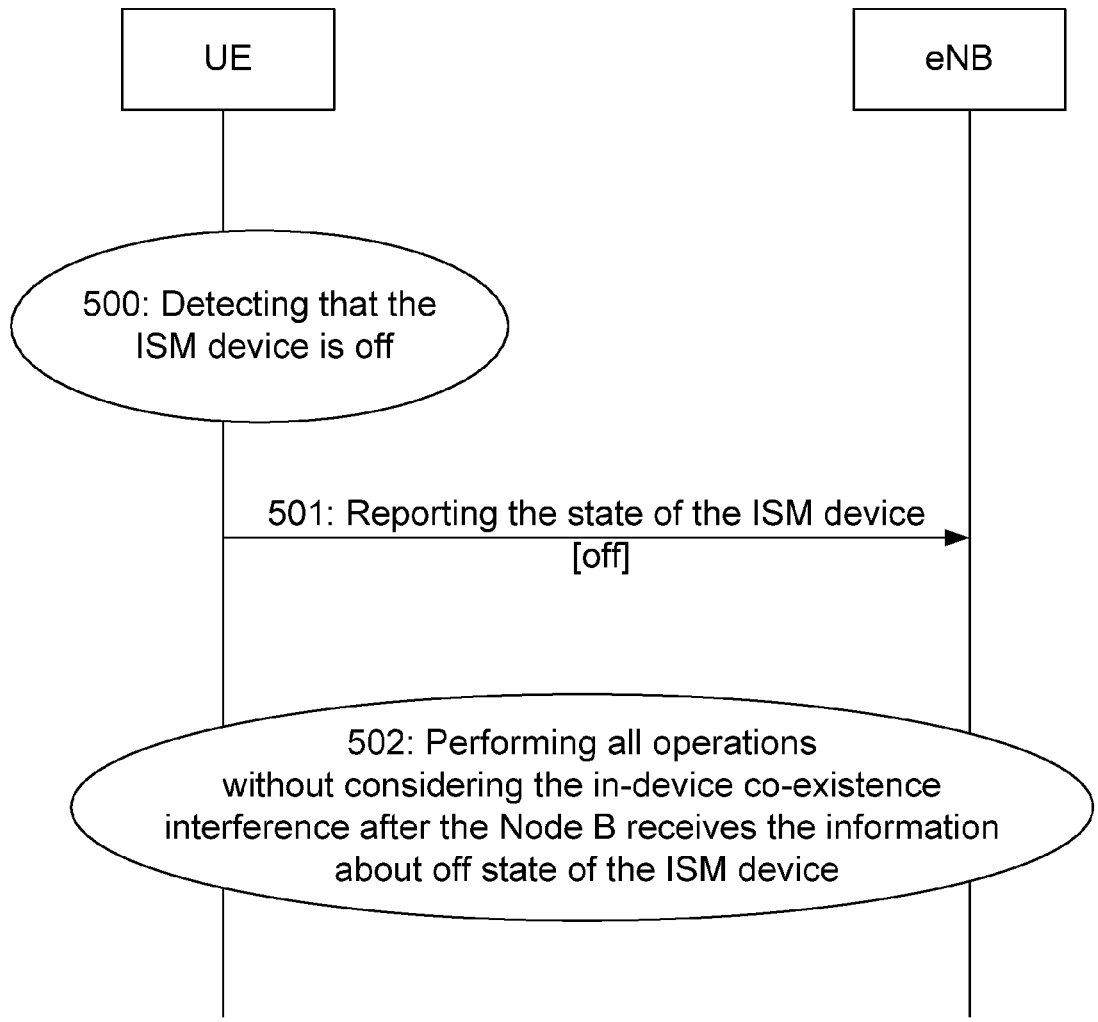
FIG. 5 is a flow chart of a second embodiment of communication implementation for the user equipment.

Particularly, referring to FIG. 5, taking the network as eNB and other sub-devices as ISM devices, when the ISM devices in the UE are off, the in-device co-existence interference in the UE does not exist (Step 500), the UE and the eNB needs no special treatment to the in-device co-existence interference. In this case, the state information reported by the UE is that the ISM devices are off (further known as "out of use") (Step 501). After the eNB receives the state information that the ISM devices are off, there is no need for all operations to consider the in-device co-existence interference any more, e.g., the eNB can delete measurement configurations for accelerating the interference detection.

Step 301: The network performs radio resource management according to the obtained state information.

The operations performed by the network according to the received state information depend on the strategy of the network. In this step, the radio resource management includes connection mobility control. Possible connection mobility control includes, but not limited to, the following types:

The first type is related operations performed according to the indicated on (in use) or off (out of use) state of other sub-devices in the received state information, which include following operations:

Operation 1, When the UE does not work on Band40/Band7, the network does not hand the UE over to Band40/Band7 when performing handover decision.

Operation 2, Measurement configurations for accelerating the interference detection are configured for the UE, e.g. reducing the time to trigger of the measurement report in the measurement configurations; reconfiguring the event trigger threshold in the measurement configurations, e.g., reducing the configuration of the offset in the current A3 event (the signal strength of a neighbouring cell is offset better than the serving cell).

From the on state of the ISM devices to the state that the ISM devices are in dense data transmission, a buffer time may exist. Through the operations of the measurement configurations for accelerating the interference detection, the UE and the network can utilize this buffer time so as to detect and avoid the in-device co-existence interference using existing techniques. That is, the UE utilizes the operations of the measurement configurations for accelerating the interference detection to measure the interference of serving cells and the signal strength of the neighbouring cells and reports the measurement results to the network, while the network performs interference avoidance according to the measurement results reported by the UE, e.g. handing the UE over to an appropriate cell, and the like.

The second type is that when the state information received by the network includes the information of (an) interfered LTE frequency band(s), the operations performed according to the information about the on (in use) or off (out of use) state of the other sub-devices and the information of the interfered LTE frequency band(s) include that:

Operation 3, when the information of the interfered LTE frequency band is Band40-UP, it means that the lower frequency band of Band40 (e.g. low 80 MHz) will not be interfered by the ISM devices. The network makes a decision according to the LTE Band40 on which the UE currently works:

when the UE works on the lower frequency band of Band40, the network determines that the UE is not subject to the in-device co-existence interference so that no operation is needed;

when the UE works in a single-carrier state and on the higher frequency band of Band40 (e.g. higher 20 MHz), the network can hand the UE over to the lower 80M frequency band of Band40; and when the information of the interfered LTE frequency band is Band40-all, it means that the whole frequency band of Band40 will be interfered, and the operations of the Node B include both operation 1 and operation 2.

The third type is that when the state information received by the network includes the information about the additional measurement results, the operation performed according to the information about the on (in use) or off (out of use) state of the other sub-devices and the information about the additional measurement results may further include:

Operation 4, when the UE currently works on Band40/Band7, the network performs handover decision according to the information about the additional measurement results reported by the UE and hands the UE over to an appropriate neighbouring cell indicated by the information about the additional measurement results. Specifically, the network selects an appropriate neighbouring cell according to the information about the additional measurement results reported by the UE, the load information of all cells and other radio resource management strategies of the network.

In this step, the radio resource management performed by the network according the received state information can further include multi-carrier management. Specifically, when the state information received by the network includes the information of an interfered LTE frequency band(s), and the information of the interfered LTE frequency band is Band40-UP, it means that the lower frequency band of Band40 (e.g. lower 80 MHz) will not be interfered by the ISM devices. When the UE works in a multi-carrier state, i.e. the UE is taking the carrier aggregation technology, the primary serving cell of the UE works on the lower frequency band of Band40 and one or more secondary serving cells work on the higher frequency band of Band40 (e.g. high 20 MHz), the network can deactivate or delete the above-mentioned secondary serving cells.

It can be seen from the method of the present disclosure that the network, already knowing the state information of the user equipment, performs radio resource management. As for the sub-devices in the user equipment which are configured to adopt the LTE technology and as for other sub-devices adopting such technologies other than the LTE technology as WLAN technology, Bluetooth technology, and the like, the method achieves effective suppression of the in-device co-existence interference, thus improving the communication quality of the radio technologies in the user equipment and the communication experience of the users.

The method of the present disclosure further includes the following step preceding the above steps: the network enables the user equipment to report the state of the in-device co-existence interference, that is, the network notifies the user equipment to enable the function of reporting the state information of other devices except the sub-device adopting the LTE technology, namely, the network enables the user equipment to report the state of other devices except the sub-device adopting the LTE technology. Specifically, the network sends enabling information in the RRC connection reconfiguration message to indicate the user equipment to report the state information of other sub-devices except the sub-device adopting the LTE technology. As other sub-devices can be on at the beginning of or before the set up of the RRC connection, the enabling information can also be sent in the RRC connection setup message. The enabling information can also be sent in the new RRC message.

It should be noted that if the UE and/or the network does not support Band40/Band7, for example the capability of the UE does not allow the UE to work on Band40/Band7 or the operator does not have the frequency of Band40/Band7, then the on state of other sub-devices except the sub-device adopting the LTE technology in the user equipment will not cause the in-device co-existence interference, therefore, the network can disable the UE that then does not report the state of the in-device co-existence interference, namely, the network does not send the enabling information to the UE.

It should be noted that the Node B does not need to explicitly notify the UE that the network enables the report of the state information of the in-device co-existence interference, instead, the UE is allowed by default to report the report of the state information of the in-device co-existence interference.

Figure 4:
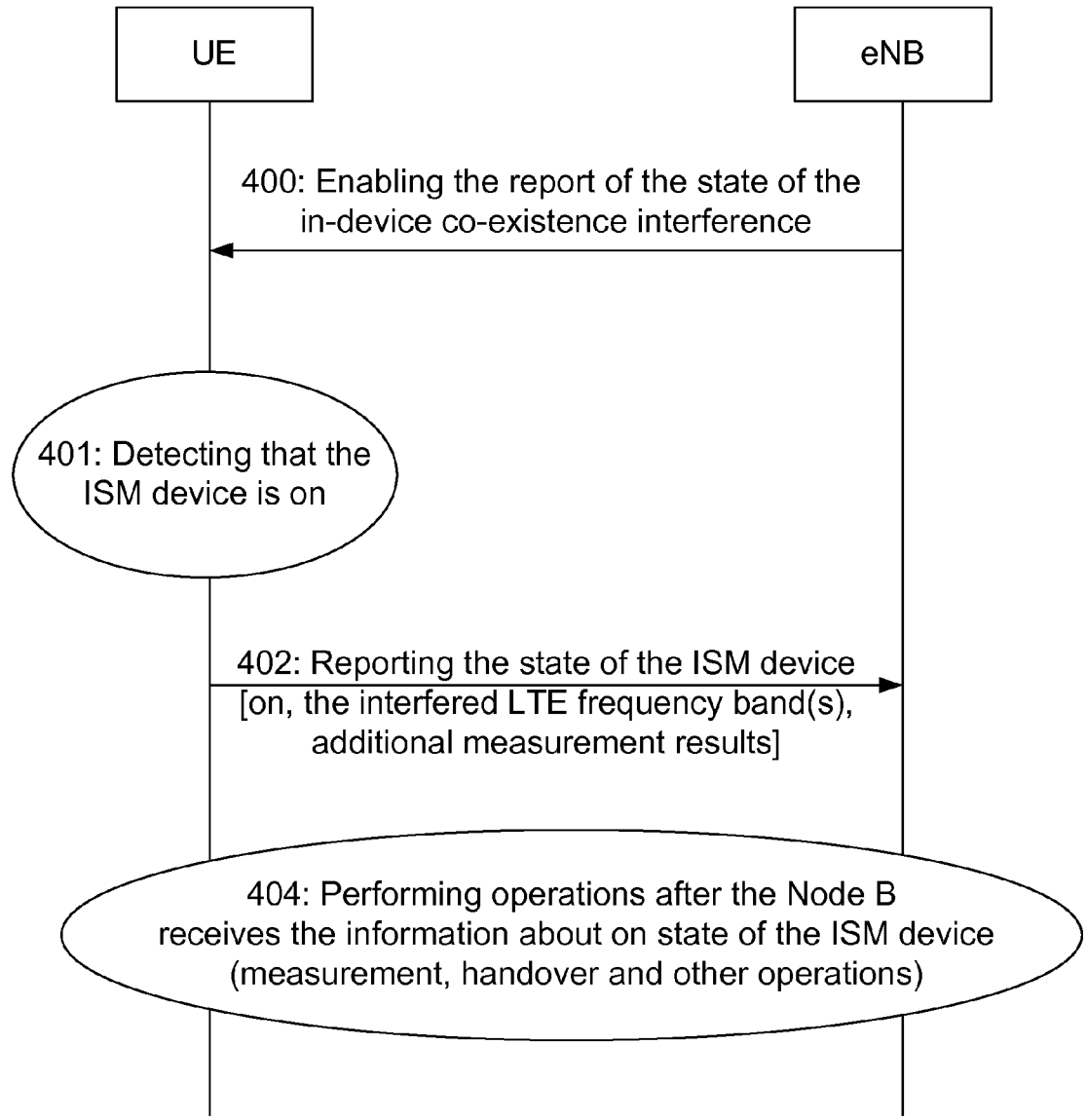
FIG. 4 is a flow chart of a first embodiment of communication implementation for the user equipment.

As shown in FIG. 4, taking the network as eNB and other sub-devices as ISM devices, the eNB enables the report of the state of the in-device co-existence interference (Step 400). When the ISM devices in the UE are on (Step 401), the state information reported by the UE is that the ISM devices are on (further known as "in use") (Step 402). After receiving the state information indicating that the ISM devices are on, the eNB performs operations related to the in-device co-existence interference according to the received state information (Step 403, with specific steps as shown in Step 301), for example the eNB can configure the measurement configurations for accelerating the interference detection.

Figure 6:
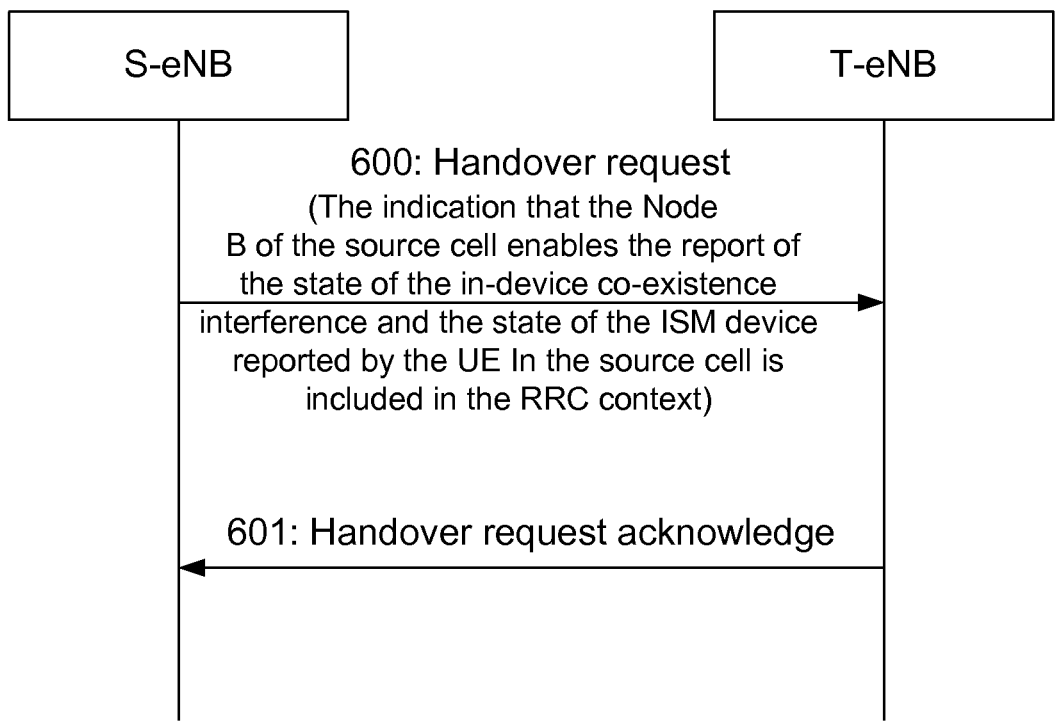
FIG. 6 is a flow chart of an embodiment of handover of the user equipment.

FIG. 6 is a flow chart of an embodiment of handover of the user equipment. Referring to FIG. 6, when a source Node B (S-eNB) hands over the UE from a source cell to a target cell according to the measurement reports from the UE, or according to the state information of other sub-devices reported by the UE, or according to other RRM algorithms. When the source Node B interacts with a target Node B (T-eNB) for handover preparation, for the sake of ensuring the normal communication of the devices adopting multiple radio technologies and co-existing in the UE after the UE is handed over to the target cell, in the case of the on state of other sub-devices, the method of the disclosure further includes the following steps:

Step 600: The source Node B sends a handover request message to the target Node B.

If the source Node B has already sent, in the source cell, to the UE an indication that the Node B enables the report of the state of the in-device co-existence interference, then the source Node B includes, in the RRC context of the handover request message, the enabling information that the Node B enables the report of the state of the in-device co-existence interference, so as to notify the target Node B. The source Node B has already enabled the function of the UE to report the report of the state of the in-device co-existence interference. The target Node B, according to its own strategy, decides whether to configure the enabling information in the RRC connection reconfiguration message subsequently sent to the UE, for enabling the report of the state of the in-device co-existence interference. If deciding to enable the function of the UE's reporting the state of the in-device co-existence interference in the target cell, the target Node B can use delta signalling configuration utilizing the indication that is transmitted from the source Node B and which the source Node B used to enable the report of the state of the in-device co-existence interference in the source cell. For example, if the target Node B decides to continue enabling the function of the UE to report the state of the in-device co-existence interference in the target cell, then, in the subsequent RRC connection reconfiguration message, the target Node B does not need to reconfigure the indication of enabling the report of the state of the in-device co-existence interference. Without reception of the enabling indication, the function needs to be kept enabled in the UE.

Further, if the source Node B has already, in the source cell, received the state information of other sub-devices that is reported by the UE, then the source Node B includes the obtained state information of other sub-devices in the RRC context of the handover request message. Specifically, the state information can include the information about on (in use) or off (out of use) state of other sub-devices, and can further include the information of the interfered LTE frequency band(s).

In the case that the UE is allowed by default to report the report of the state of the in-device co-existence interference and that the source Node B has already, in the source cell, received the state information of other sub-devices that is reported by the UE, in this step, the source Node B includes the obtained state information of other sub-devices in the RRC context of the handover request message. Specifically, the state information may include the information about on (in use) or off (out of use) state of other sub-devices, and can further include the information of the interfered LTE frequency band(s).

Step 601: The target Node B sends a handover request acknowledge message to the source Node B.

After receiving the handover request acknowledge message from the target Node B, the source Node B notifies the UE to initiate handover. After the UE successfully hands over to the target cell under the target Node B, to ensure the normal communication of multiple radio technologies in the UE, the method as shown in FIG. 3 is adopted for the communication of the UE and the target Node B.

According to the present disclosure, by transmitting the indication of enabling the report of the state of the in-device co-existence interference by the source cell during the handover preparation, the state information of other sub-devices which is reported by the UE in the source cell, is further transmitted, so that the target Node B directly utilizes the state information of other sub-devices and the normal communication of the devices that adopts multiple radio technologies and co-exist is ensured after the handover.

It should be noted that if there is no direct interface between the above-mentioned source Node B and target Node B, the above-mentioned handover preparation needs to be routed by Mobility Management Entity (MME). In this case, the indication of enabling the report of the state of the in-device co-existence interference by the source Node B and the state information of other sub-devices that is reported by the UE in the source Node B is included in the RRC context that is included in the handover required message sent by the source Node B to the MME and also included in the handover command sent by the MME to the target Node B.

Corresponding to the method of the present disclosure, a system for communication implementation for a user equipment is further provided, which includes a user equipment and a network. The user equipment is provided with a sub-device adopting LTE technology and other sub-devices adopting other technologies except LTE technology, such as WLAN technology, Bluetooth technology.

The user equipment is configured to acquire state information of other sub-devices except the sub-device adopting LTE technology, and to report the acquired state information to the network.

The network is configured to perform radio resource management according to the state information. The network may be a Node B.

The network is further configured to enable the user equipment to report the state of the in-device co-existence interference.

When the user equipment performs handover and the network is a source network, the system further includes a target network.

The source network is further configured to send a handover request message to the target network to which the user equipment will be handed over; wherein the RRC context of the handover request message includes enabling information of the source network to enable the report of the state of the in-device co-existence interference.

The target network is configured to return the handover request acknowledge message to the source network.

The source network is further configured to include in the handover request message the information about the on and off state of other sub-devices except the sub-device adopting the LTE technology in the user equipment.

The source target network is further configured to include in the handover request message the information about the interfered LTE frequency band(s).

The above descriptions are only preferred embodiments of the present disclosure and provided not for limiting the protection scope of the disclosure. Any modifications, equivalent replacements and improvements within the principle of the disclosure should be included within the protection scope of the disclosure.

The invention claimed is:

1. A method for communication implementation for a user equipment, comprising:
enabling, by a network, a user equipment to report the state information of other sub-devices except a sub-device adopting the LTE technology,
acquiring, by the user equipment, the state information of the other sub-devices by means of the sub-device adopting the LTE technology through an inter-radio interface or a control device in the user equipment;
reporting, by the user equipment, to the network the state information of other sub-devices except the sub-device adopting Long Term Evolution (LTE) technology; and
performing, by the network, radio resource management according to the state information,
wherein the sub-device and the other sub-devices are inside the user equipment, and
wherein the state information comprises information about on or off state of other sub-devices except the sub-device adopting the LTE technology in the user equipment, and information about (an) interfered LTE frequency band(s).

2. The method according to claim 1, wherein the enabling, by the network, the user equipment to report the state information of other sub-devices except the sub-device adopting the LTE technology comprising:
sending, by the network, enabling information in the Radio Resource Control (RRC) connection reconfiguration message, wherein the enabling information is to instruct the user equipment to report the state information of other sub-devices inside the user equipment except the sub-device adopting the LTE technology; or,
sending, by the network, the enabling information in an RRC connection setup message; or,
sending, by the network, the enabling information in a new RRC message.

3. The method according to claim 1, wherein the state information further comprises information about additional measurement results.

4. The method according to claim 3, wherein the information about additional measurement results is:
  measurement results of all neighbouring cells, for all configured measurement tasks, already meet measurement report conditions of the respective measurement task and are saved in a cell trigger list corresponding to the respective measurement task; or,
  measurement results of N strongest neighbouring cells, for all configured measurement tasks, which already meet measurement report conditions of the respective measurement task and are saved in a cell trigger list corresponding to the respective measurement task, wherein N is a value preset for the network and the user equipment.

5. The method according to claim 1, wherein the reporting the state information to the network comprises:
  reporting the state information to the network by including the state information in an expanded proximity indication message; or,
  reporting the state information to the network by including the state information in an expanded RRC connection setup complete message; or,
  reporting the state information to the network by including the state information in an expanded RRC connection reconfiguration complete message; or,
  reporting the state information to the network by including the state information in a new RRC message.

6. The method according to claim 1, wherein the performing, by the network, radio resource management according to the state information comprises: performing connection mobility control or multi-carrier management according to the state information.

7. The method according to claim 6, wherein the performing, by the network, connection mobility control according to the information comprises:
  performing operations according to the on or off state of the other sub-devices displayed by the received state information, which comprises: when the user equipment does not work on Band40/Band7, the network does not hand the user equipment over to Band40/Band7when performing handover decision; or,
  configuring the user equipment with measurement configurations for accelerating an interference detection.

8. The method according to claim 6, wherein the state information comprises information about on or off state of other sub-devices except the sub-device adopting LTE technology in the user equipment and information about (an) interfered LTE frequency band(s);
  wherein the performing, by the network, connection mobility control according to the state information comprises: performing following operations according to the information about on or off state of other sub-devices and the information about the interfered LTE frequency band(s):
    when the information about the interfered LTE frequency band is Band40-UP:
      when the user equipment works on the lower frequency band of Band40, the network determines that the UE is not subject to the in-device co-existence interference so that no operation is needed; or,
      when the user equipment works in a multi-carrier state, a primary serving cell works on the lower frequency band of Band40and one or more secondary serving cells works on the higher frequency band of Band40, the network deactivates or deletes one or more of the secondary serving cells; or,
      when the user equipment works in a single-carrier state and on the higher frequency band of Band40, the network hands the user equipment over to the lower 80M frequency band of Band40; and
    when the received information about the interfered LTE frequency band is Band40-all, which means that the whole frequency band of Band40is interfered, performing following operations according to the information about on or off state of other sub-devices showing by the state information:
      when the user equipment does not work on Band40/Band7, the network does not hand the user equipment over to Band40/Band7when performing handover decision; and
      configuring the user equipment with measurement configurations for accelerating an interference detection.

9. The method according to claim 6, wherein the state information comprises the information about the on or off state of other sub-devices except the sub-device adopting LTE technology in the user equipment and the information about the additional measurement results;
  wherein the performing, by the network, connection mobility control according to the state information comprises:
    when the user equipment works on Band40/Band7, the network performs handover decision according to the information about the additional measurement results reported by the user equipment and hands the user equipment over to a neighbouring cell indicated by the information about the additional measurement results.

10. The method according to claim 6, wherein the state information comprises the information about the interfered LTE frequency band, which is Band40-UP;
  wherein the performing, by the network, multi-carrier management comprises:
    when the user equipment works in a multi-carrier state, a primary serving cell of the user equipment works on the lower frequency band of Band40and one or more secondary serving cells works on the higher frequency band of Band40, the network deactivates or deletes the one or more of the secondary serving cells.

11. A method for handover implementation for a user equipment, comprising:
  sending, by a source network of a user equipment, a handover request message to a target network to which the user equipment will be handed over; wherein RRC context of the handover request message includes enabling information about the source network enabling a user equipment to report the state information of other sub-devices except a sub-device adopting the LTE technology; and
  returning, by the target network, a handover request acknowledge message to the source network; then communication between the user equipment and the target network comprises that the user equipment reports to the target network the state information of other sub-devices except a sub-device adopting LTE technology; and
  performing, by the target network, radio resource management according to the state information,
  wherein the sub-device and the other sub-devices are inside the user equipment,
  wherein the handover request message further includes information about on or off state of other sub-devices except the sub-device adopting the LTE technology in the user equipment, and information about (an) interfered LTE frequency band(s).

12. A system for communication implementation for a user equipment, comprising a user equipment and a network, wherein the user equipment is provided with a sub-device adopting Long Term Evolution (LTE) technology and other sub-devices adopting other technologies except the LTE technology;

wherein, the user equipment is configured to acquire the state information of other sub-devices by means of the sub-device adopting the LTE technology through an inter-radio interface or a control device in the user equipment, the other sub-devices being sub-devices except the sub-device adopting the LTE technology , and to report the acquired state information to the network; and the network is configured to enable the user equipment to report the state information of other sub-devices except the sub-device adopting the LTE technology, and further configured to perform radio resource management according to the state information;

wherein the network is a Node B, the sub-device and the other sub-devices are inside the user equipment, and wherein the state information comprises information about on or off state of other sub-devices except the sub-device adopting the LTE technology in the user equipment, and information about (an) interfered LTE frequency band(s).

13. The system according to claim 12, further comprising a target network when the user equipment performs handover and the network is a source network; wherein, the source network is further configured to send a handover request message to the target network to which the user equipment will be handed over; wherein RRC context of the handover request message includes enabling information of the source network to enable the user equipment to report the state of other sub-devices except the sub-device adopting the LTE technology; and the target network is configured to return a handover request acknowledge message to the source network.

14. The system according to claim 13, wherein the source network is further configured to include in the handover request message information about on or off state of other sub-devices in the user equipment except the sub-device adopting the LTE technology.

15. The system according to claim 14, wherein the source target network is further configured to include in the handover request message information about (an) interfered LTE frequency band(s).

\* \* \* \* \*